…

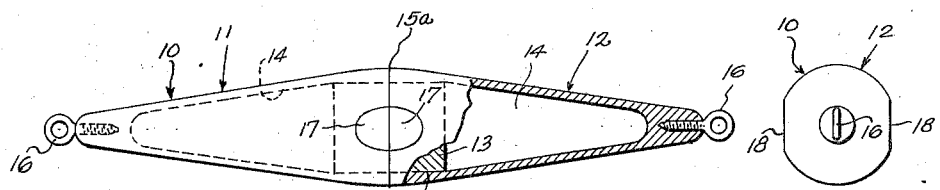

United States Patent Office

2,699,624
Patented Jan. 18, 1955

2,699,624

FISHING FLOAT

Michael Vawryk, Lyndora, Pa.

Application December 29, 1950, Serial No. 203,489

1 Claim. (Cl. 43—44.87)

This invention relates to fishing tackle and, in particular, to fishing floats.

One object of this invention is to provide a fishing float which is sufficiently weighted for longer-distance casting.

Another object is to provide a fishing float wherein the enclosed weight serves to connect the hollow halves in assembly.

Another object is to provide a fishing float which can be quickly and easily adjusted and locked in any desired position along the line, and as easily released and moved to a new position.

A still further object is to provide a fishing float so constructed as to resist rolling or spinning, and thus to resist tangling or twisting of the line.

In the drawings:

Fig. 1 shows a side elevation partly in section of a fishing float constructed according to one form of the invention;

Figure 2 shows an end elevation of the float shown in Figure 1;

Figure 3 shows a side elevation partly in section of a fishing float constructed according to another form of the invention;

Figure 4 shows an end elevation of the float shown in Figure 3;

Figure 5 shows a side elevation, partly in section, of a fishing float constructed according to a third form of the invention;

Figure 6 shows an end elevation of the float shown in Figure 5;

Figure 7 shows a view, in section, of one end of the float of Figure 5, showing the float in use with a fishing line;

Figure 8 shows a side elevation of a fishing float constructed according to a fourth form of the invention;

Figure 9 shows an end elevation of the float shown in Figure 8;

Figure 10 shows a side elevation of a fishing float constructed according to a fifth form of the invention; and Figure 11 shows an end elevation of the float shown in Figure 10.

Referring to the drawings in detail, Figure 1 shows a fishing float, generally designated 10, consisting generally of two substantially similar hollow halves, generally designated 11 and 12, connecting with each other as at 15a and with an interior weight, preferably cylindrical and generally designated 13. The tapering hollow halves 11 and 12, and corresponding parts in other forms of the invention, may be constructed preferably of synthetic plastic or wood or any other suitable material.

Each of the halves 11 and 12 is provided with a hollow cavity 14, tapering with the structure throughout most of its length, but having bores as at 15 to receive the weight 13 in assembly. The outer end of each of these halves is furnished with a screw eye 16, through which the fishing line passes when the float is in use. Each of the halves is also provided with two semi-elliptical flat areas 17, each of which joins with the corresponding area 17 of the other half in assembly to provide the float 10 with two oppositely-located flat surfaces 18 (Figure 2), elliptical in outline, the purpose of which is to prevent the float from rolling or spinning.

Figure 3 shows a fishing float, generally designated 19, constructed according to another form of the invention and consisting generally of two substantially similar hollow halves, generally designated 20 and 21, which are connected by a central weight 22. Each of the halves 21 and 22 is tapering in shape, and is furnished with a similarly tapering hollow cavity 23, the mouth of which is threaded as at 24 to receive a correspondingly-threaded portion 25 of the weight 22. The outer end of each of these halves is provided with two notches 26 to receive the ends of a C-shaped snap ring 27. The extreme outer end of each half is also provided with a notch or groove 28 into which the middle portion of the ring 27 snaps into position, and a deeper groove 29, cut at right angles to the groove 28 and intended for the fishing line, which is held firmly when the ring 27 is snapped into the groove 28. The weight 22 is furnished with a widened somewhat cylindrical portion 30, from which the narrower threaded end portions 25 extend, and which serves as a connecting outer segment between the nearer ends 24 of the two halves of the float 19. The opposite sides of the portion 30 are provided with flattened areas 31 (Figure 4) to prevent rolling of the float 19 when it is in use.

Figure 5 shows a fishing float, generally designated 32, according to a third form of the invention, consisting generally of two hollow tapering halves, generally designated 33 and 34, substantially similar to each other and somewhat resembling the halves 11 and 12 of the float 10 in Figure 1, and connecting with each other as at 37a and with an interior weight generally designated 35. Each of the halves 33 and 34 is furnished with a hollow cavity 36 as in the previous forms of the invention (Figures 1 and 3) tapering with the structure, except at the mouth 37 which is bored to receive the weight 35. At the small end of each of the halves 33 and 34 is a countersunk hole 38, connecting with the interior cavity 36, in which the cylindrical shank 39 of an eye-pin 40 slides. The shank 39 is provided with a hole 41 threaded to receive a screw 42. The said screw is furnished with a spring 43 which provides a tension serving to keep the head 44 of the eye-pin 40 seated firmly against the countersunk shoulders 45 of the hole 38. Within the cavity 36 is inserted and secured a disc-like partition 46, at a sufficient distance from the small end to permit the screw 42 to move back and forth with the pin 40. Each of the halves 33 and 34 is provided at its other end with two semi-elliptical flat areas 47, oppositely located, and very similar to the flat areas 17 of the float 10 in Figure 1. In the assembly of the halves 33 and 34, the flat areas 47 of each half join with the corresponding flat areas 47 of the other half to produce two flat surfaces 48, located on opposite sides of the fishing float 32 (Figure 5) and tending to prevent it from spinning.

Figure 8 shows a fishing float, generally designated 49, according to a fourth form of the invention, consisting generally of two substantially similar halves, generally designated 50 and 51, connecting with each other as at 58a and with an interior weight 52. Each of the tapering halves is furnished with a screw-eye 16 at its outer end and has a narrow rib 53, consisting of similar surfaces 54 located at an oblique angle to each other and meeting in a ridge 55. In assembly of the halves, the two corresponding ribs 53 are joined to form one. Within each of the halves is a hollow cavity 56, tapering with the structure and semi-circular in cross-section (Figure 9) except for a groove 57 included as a part of the cavity and extending up into the rib 53, and a bored portion 58 designed to receive the weight 52. The said weight is provided with a rib 59 which is enclosed within the bored portion 58 of the groove 57 of each of the halves in assembly.

A modification of the fishing float 49 of Figure 8 is shown in Figure 10. Generally designated 60, it consists generally of two largely similar halves 61 and 62, joined to each other as at 69a and to an interior weight 63. Each of the halves 61 and 62 has a screw-eye 16 at its small outer end and is provided with a broad rib 64 having two similar surfaces 65, located at oblique angles to each other and meeting in a ridge 66. Extending through most of the length of each of the halves is a tapering hollow cavity 67, semi-circular in cross-section (Figure 11) except for a groove 68 extending up inside the rib 64. Each of the halves is bored as at 69 to receive the weight 63, which is itself provided with a rib 70 which fits into the bored portion 69 of the grooves 68 of the halves 61 and 62 when the float 60 is assembled. As with the other floats previously described, the parts of each of the halves 61 and 62 generally correspond with similar parts of the other of the two halves, and in the case of the rib 64 found on each half, a single rib is formed by the union of the two ribs 64 in the assembly process.

In the assembly of the float 10 in Figure 1, the two halves 11 and 12 are joined together at 15a and with the interior weight 13, each end of which is received in the bored mouth 15 of either of the halves by means of cement so as to insure a water-tight joint. The two air cavities 14 provide flotation, being supplemented by the lightness of the material, preferably moulded plastic, of which the float is constructed. Of course, the semi-elliptical surfaces 17 on each of the halves must be situated adjacent to the similar corresponding surfaces 17 on the other half so as to present two complete elliptical flat surfaces 18 located on opposite sides of the float.

The assembly of the float 49 in Figure 8 and the float 60 in Figure 10 is very similar to that of the float 10 just described. The halves 50 and 51 of the float 49 are joined to each other as at 58a and to the interior weight 52 received in the bored portion 58 of each of the halves. Each of the narrow ribs 53 is joined with the other corresponding to it to form a single rib running nearly the full length of the float. In the same fashion, glue or cement is used to join the two halves of the float 60 with each other as at 69a and with the interior weight 63, the two broad ribs 64 combining to form one. The hollow cavities 56 in the float 49 and 67 in the float 60 provide flotation, being made watertight by the cemented joint.

In use, all three of these fishing floats just described are attached to the fishing line by running the line through each of the eyes 16 at either end of any of the floats 10, 49 or 60 and knotting or looping it at either or both ends of the float. In this fashion, the float may be secured upon the fishing line at any desired distance from the hook and bait, thus permitting these latter to remain at any desired distance below the surface of the water. The weights 13, 52 and 63 in the floats 10, 49 and 60 respectively permit longer casting, the inertia of the weight carrying the tackle far out from the fisherman, and thus enabling fishing in otherwise inaccessible spots. The elliptical flattened area 18 of the float 10 and the ribs 53 and 64 of the floats 49 and 60 respectively, tend to prevent the floats from rolling or spinning or otherwise rotating along their longitudinal axes while being drawn through the water when being retrieved or in trolling, and thus tends to prevent the floats from twisting or tangling the lines to which they are attached.

The assembly of the float 32 in Figure 5 is largely similar to the assembly, previously described, of the floats 10, 49 and 60. The two halves 33 and 34 are joined with cement to each other at 37a and to the interior weight 35, which is accommodated by fitting into the bored portions 37 of the cavities of the halves. The halves are so aligned that the flat surfaces 47 form two whole elliptical surfaces 48. Before the major parts are joined, however, it is necessary to secure the eye-pin 40 in a slidable position in the hole 38 of each of the halves by means of the screw 42 threaded into the hole 41 in the pin shank 39 and encircled by the spring 43. The spring maintains a constant tension between the head of the screw 42 and that part of the small end of the inside cavity 36 immediately surrounding the hole 38, and tends to force them apart, thus seating the head 44 of the eye-pin 40 against the countersunk shoulders 45 of the hole 38, from which it may be partly withdrawn by the application of a superior pulling force sufficient to overcome the force of the compressed spring. Upon release, however, the eye-pin 40 will snap back to its former position with its head against the shoulders of the hole.

An additional step preliminary to the final assembly is the insertion of a disc or partition 46 in the cavity 36 of each of the halves and the securing of it by means of cement. The purpose of the partition is to prevent any water seeping through the hole 38 past the sliding pin shank 39 from filling the whole of the flotation compartment 36 and thus causing the float 32 to sink.

In the use of the modified float 32 shown in Figures 5 and 6 the fishing line L is drawn through the eye of the pin 40, which is pulled out to permit the line to be then wrapped around the shank one or more times (Figure 7). The pin is then released and allowed to snap back into its former position, the line being gripped with yieldable force between the head 44 of the pin and the shoulders 45 of the countersunk hole 38. The rest of the line is then passed through the eye of the pin 40 at the other end of the float, and the process repeated. The float 32 may be placed in any desired position along the line and secured in this fashion, but may be easily removed by partly withdrawing the pin 40 from the hole 38 and unwinding the line L from the pin shank 39 of each end of the float. The line may then be drawn out through the eye, but this last step is unnecessary if the float is merely to be moved to a new position on the line. To facilitate winding and unwinding the pin 40 may be turned in the hole 38 by hand. As with the previously described forms of the invention, the weight 35 permits longer casting of the float and the flat surfaces 48 tend to prevent the float from rolling when it is drawn through the water.

The assembly of the float 19 shown in Figure 3 is somewhat different from that of the others. Since the weight 22, which forms part of the exterior, is threaded as at 25 to receive the correspondingly threaded portions 24 of the halves 20 and 21, it is merely necessary to screw the said halves onto the weight. Cement is, therefore, optional.

To attach the float 19 to a fishing line, it is only necessary to press the snap ring 27 to one side, thus unseating it from the groove 28, after which the line is passed through the ring 27 and the deep groove 29. The snap ring is then pressed back until it snaps back into the groove 28, gripping the line in the deeper groove 29 beneath it. The process is then repeated with the similar snap ring at the other end of the float. As with the others, this float may easily be placed in any position on the line. To loosen the grip of the snap rings upon the line, it is necessary to press them to one side, as before, snapping them out of position in the grooves 28 and to draw the line through to a new position before snapping the rings back into the grooves 28, again gripping the line.

The weight, of course, provides the momentum necessary for long casing and the flat surfaces 31 included as part of the weight 22 resist any rolling tendency of the float.

What I claim is:

A fishing float comprising a hollow body having a closed central chamber and a separate end chamber disposed adjacent the center and one end of said body respectively, said one end having a bore extending inwardly into said end chamber from the exterior thereof, a line-clamping plunger having an elongated shank snugly but reciprocably mounted in said bore and having on its outer end an eye of larger diameter than said bore, said end of said body having a recess therein adjacent the outer end of said bore and configured to fit the rearward end of said eye, and a spring disposed within said end chamber engaging the inner end of said shank and resiliently urging said plunger into said bore and thereby urging the rearward end of said eye into said recess into clamping engagement with a fishing line disposed therebetween.

References Cited in the file of this patent

UNITED STATES PATENTS

| 240,611 | Redfield | Apr. 26, 1881 |
| 1,504,065 | Lower | Aug. 5, 1924 |
| 2,242,965 | Adams | May 20, 1941 |
| 2,252,358 | Tosi | Aug. 12, 1941 |
| 2,322,241 | Kurz | June 22, 1943 |
| 2,569,822 | Miller | Oct. 2, 1951 |
| 2,597,836 | Klie | May 20, 1952 |

FOREIGN PATENTS

| 417,604 | Great Britain | Oct. 8, 1934 |